(12) United States Patent
Xiao et al.

(10) Patent No.: US 7,293,431 B2
(45) Date of Patent: Nov. 13, 2007

(54) APPARATUS FOR COOLING A FILAMENT FORMING AREA OF A FILAMENT FORMING APPARATUS

(75) Inventors: Jun Xiao, Granville, OH (US); Richard A. Green, Pataskala, OH (US)

(73) Assignee: Owens Corning Intellectual Capital, LLC DE (US)

( * ) Notice: Subject to any disclaimer, the term of this patent is extended or adjusted under 35 U.S.C. 154(b) by 673 days.

(21) Appl. No.: 10/426,489

(22) Filed: Apr. 30, 2003

(65) Prior Publication Data

US 2006/0117802 A1    Jun. 8, 2006

(51) Int. Cl.
   *C03B 37/085* (2006.01)
(52) U.S. Cl. .................. 65/498; 65/481; 65/511; 65/512
(58) Field of Classification Search ............ 65/498, 65/481, 511, 512
   See application file for complete search history.

(56) References Cited

U.S. PATENT DOCUMENTS

| | | | |
|---|---|---|---|
| 2,947,028 A | 8/1960 | Slayter | |
| 3,232,730 A | 2/1966 | Drummond | |
| 3,256,078 A | 6/1966 | Drummond | |
| 3,264,076 A | 8/1966 | Veazie et al. | |
| 3,334,981 A | 8/1967 | Glaser | |
| 3,345,147 A | 10/1967 | Russell | |
| 3,518,069 A * | 6/1970 | Cole, Jr. ................ | 65/481 |
| 3,695,858 A | 10/1972 | Russell | |
| 3,708,271 A | 1/1973 | Loewenstein et al. | |
| 3,746,525 A | 7/1973 | Kasuga et al. | |
| 3,775,074 A | 11/1973 | Russell | |
| 3,829,301 A | 8/1974 | Russell | |
| 3,849,101 A | 11/1974 | Nytha et al. | |
| 3,867,119 A | 2/1975 | Kasuga et al. | |
| 4,018,586 A | 4/1977 | Cates, Jr. et al. | |
| 4,033,742 A | 7/1977 | Nichols et al. | |
| 4,055,406 A | 10/1977 | Slonaker et al. | |
| 4,088,469 A | 5/1978 | Schaefer | |
| 4,125,387 A | 11/1978 | Gunter | |
| 4,140,506 A | 2/1979 | Machlan | |
| 4,146,373 A | 3/1979 | Sullivan et al. | |
| 4,197,103 A | 4/1980 | Ishikawa et al. | |
| 4,227,906 A | 10/1980 | Rieser | |
| 4,310,602 A | 1/1982 | Martin, Jr. | |
| 4,330,311 A | 5/1982 | Jensen | |
| 4,332,602 A | 6/1982 | Jensen | |
| 4,352,687 A | 10/1982 | Boettner | |
| 4,398,933 A | 8/1983 | Lecron et al. | |
| 4,469,499 A | 9/1984 | Lecron et al. | |
| 4,643,750 A | 2/1987 | Glaser | |
| 4,657,573 A | 4/1987 | Jones | |
| 4,662,922 A | 5/1987 | Hill et al. | |
| 4,704,150 A | 11/1987 | McEarthron | |
| 4,824,457 A | 4/1989 | Jensen | |
| 5,244,483 A | 9/1993 | Brosch et al. | |
| 5,693,118 A * | 12/1997 | Snedden et al. ............ | 65/511 |
| 5,709,727 A | 1/1998 | Bobba | |
| 5,846,285 A | 12/1998 | Srinivasan et al. | |

(Continued)

*Primary Examiner*—Mark Halpern
(74) *Attorney, Agent, or Firm*—Inger H. Eckert; Margaret S. Millikin

(57) ABSTRACT

A cooling apparatus includes a manifold defining a fluid channel, and also includes a plurality of cooling fins connected to the manifold, wherein at least a portion of a surface of the fins includes porous material.

20 Claims, 5 Drawing Sheets

U.S. PATENT DOCUMENTS

| | | |
|---|---|---|
| 5,979,192 A | 11/1999 | Srinivasan |
| 6,192,714 B1 * | 2/2001 | Dowlati et al. ............... 65/481 |
| 6,196,029 B1 | 3/2001 | Melia et al. |
| 6,408,654 B1 | 6/2002 | Boessneck et al. |

* cited by examiner

APPARATUS FOR COOLING A FILAMENT FORMING AREA OF A FILAMENT FORMING APPARATUS

TECHNICAL FIELD AND INDUSTRIAL APPLICABILITY OF THE INVENTION

This invention relates generally to an apparatus for producing continuous glass filaments. More particularly, this invention relates to an apparatus having a bushing and a filament forming area beneath the bushing. A cooling apparatus is positioned beneath the bushing for cooling the filament forming area. The invention is useful in the production of continuous glass filaments that may be used as reinforcement in molded resinous articles.

BACKGROUND OF THE INVENTION

In the manufacture of continuous glass filaments, glass is melted in a glass melter or furnace and flows to one or more bushings. Each bushing has a number of nozzles or tips through which streams of molten glass flow. The glass streams are mechanically pulled from the nozzles by a winding apparatus to form continuous glass filaments.

The temperature of the molten glass within the bushing must be high enough to maintain the glass in a liquid state. However, if the temperature is too high, the molten glass will not cool sufficiently so as to become viscous enough to form filaments after passing through the bushing tips. Thus, the glass must be quickly cooled or quenched after it flows from the bushing tips and forms glass filaments. If the glass cools too slowly, the glass filaments will break and the filament forming process will stop.

There are numerous types of apparatus for cooling the glass filament forming area beneath a filament forming machine. A conventional cooling apparatus uses air, water, or both to transfer heat from the filament forming area beneath a bushing and cool the glass filaments. An example of a glass filament forming apparatus is disclosed in U.S. Pat. No. 6,192,714 to Dowlati et al., the disclosure of which is expressly incorporated herein by reference.

Known cooling apparatus can include a plurality of cooling fins. Filaments drawn from the bushing pass on either side of a cooling fin. Heat from the glass is radiantly and convectively transferred to the fins from the glass filaments. The heat passes conductively through the fins and to a water-cooled manifold. Such cooling fins increase the surface area of the cooling apparatus, thereby increasing the amount of heat that can be transferred from the filament forming area.

Typically, a cooling fluid supply, such as water, enters the manifold, travels through a channel, and exits the opposite end of the manifold as a cooling fluid return. The cooling fluid absorbs heat as it flows through the manifold, thereby cooling the manifold, the cooling fins, and indirectly, the filament forming area. However, the amount of heat that such a cooling apparatus can remove from the filament forming area is limited. Heat must travel through the cooling fins and the manifold before it is absorbed by the cooling fluid flowing through the manifold.

Another conventional cooling apparatus includes a manifold and fins, wherein cooling fluid flows from the manifold into a passage (typically U-shaped) in the cooling fin and back to the manifold. However, the amount of heat that can be absorbed by the cooling fluid in such a cooling apparatus is still limited.

If heat can be more rapidly removed from the filament forming area beneath a bushing, the operating temperatures of the bushing and the molten glass in the bushing can be increased, thereby allowing overall throughput to be increased. Accordingly, there is a need for an improved method and apparatus for cooling a filament forming area beneath a bushing to remove a greater amount of heat.

SUMMARY OF THE INVENTION

This invention relates to an improved apparatus for cooling a glass filament forming area beneath a bushing of a filament forming apparatus. According to this invention there is provided a cooling apparatus that includes a manifold defining a fluid channel, and also includes a plurality of cooling fins connected to the manifold, wherein at least a portion of a surface of the fins includes porous material.

According to this invention there is also provided a cooling apparatus for cooling a glass filament forming area beneath a bushing of a filament forming apparatus, the cooling apparatus including a manifold defining a fluid channel, and also includes a plurality of cooling fins connected to the manifold, wherein at least a portion of a surface of the fins includes a groove.

According to this invention there is also provided apparatus for producing continuous glass filaments, the apparatus including a bushing for supplying streams of molten glass to be drawn into continuous glass filaments, a cooling apparatus for cooling a glass filament forming area beneath the bushing. The cooling apparatus includes a manifold defining a fluid channel, and also includes a plurality of cooling fins connected to the manifold, wherein at least a portion of a surface of each fin includes porous material.

Various objects and advantages of this invention will become apparent to those skilled in the art from the following detailed description of the preferred embodiment, when read in light of the accompanying drawings.

DETAILED DESCRIPTION AND PREFERRED EMBODIMENTS OF THE INVENTION

Figure 1:
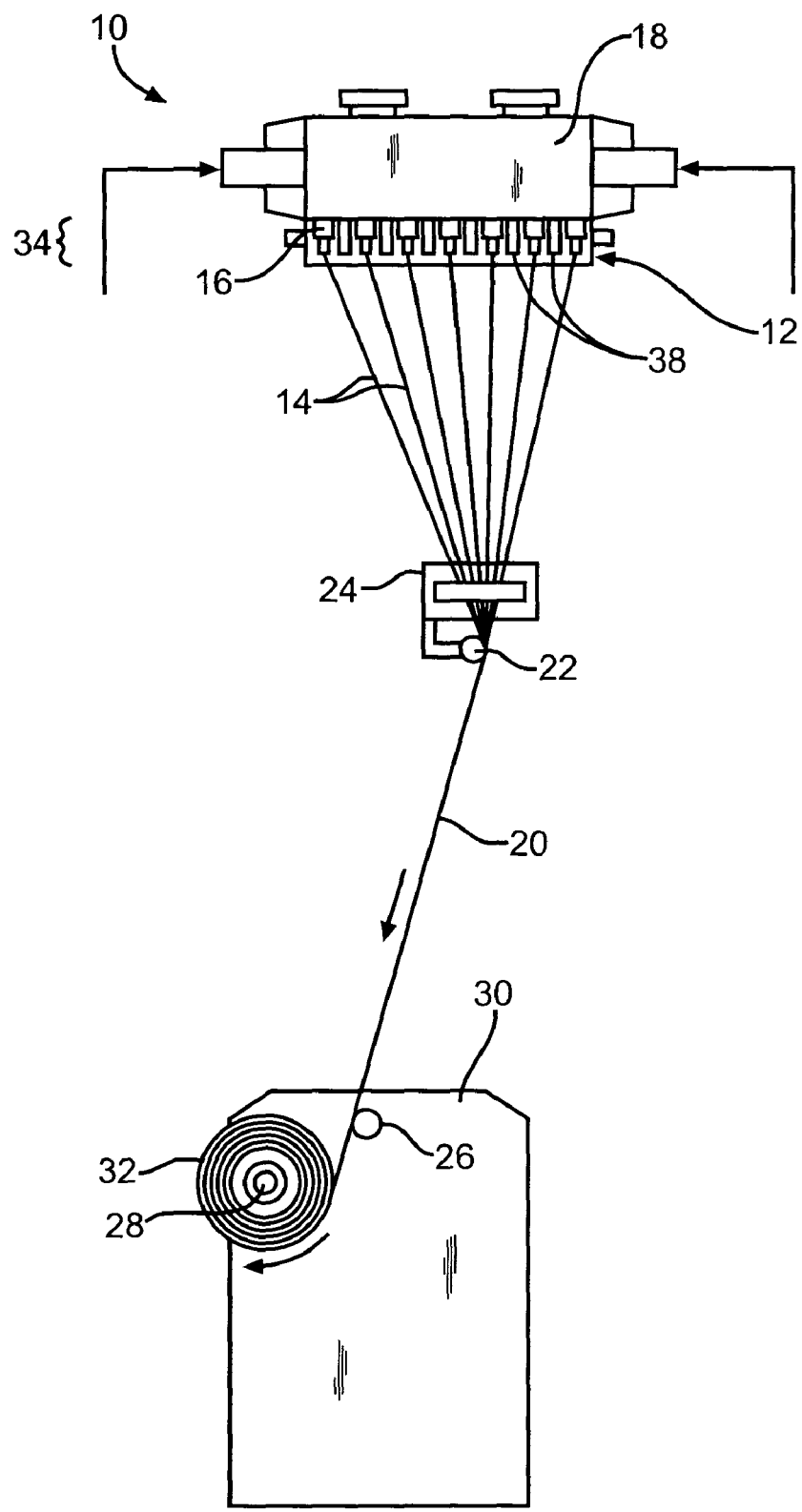
FIG. 1 is a schematic view in elevation of a glass filament forming apparatus showing a cooling apparatus in accordance with the invention.
Figure 2:
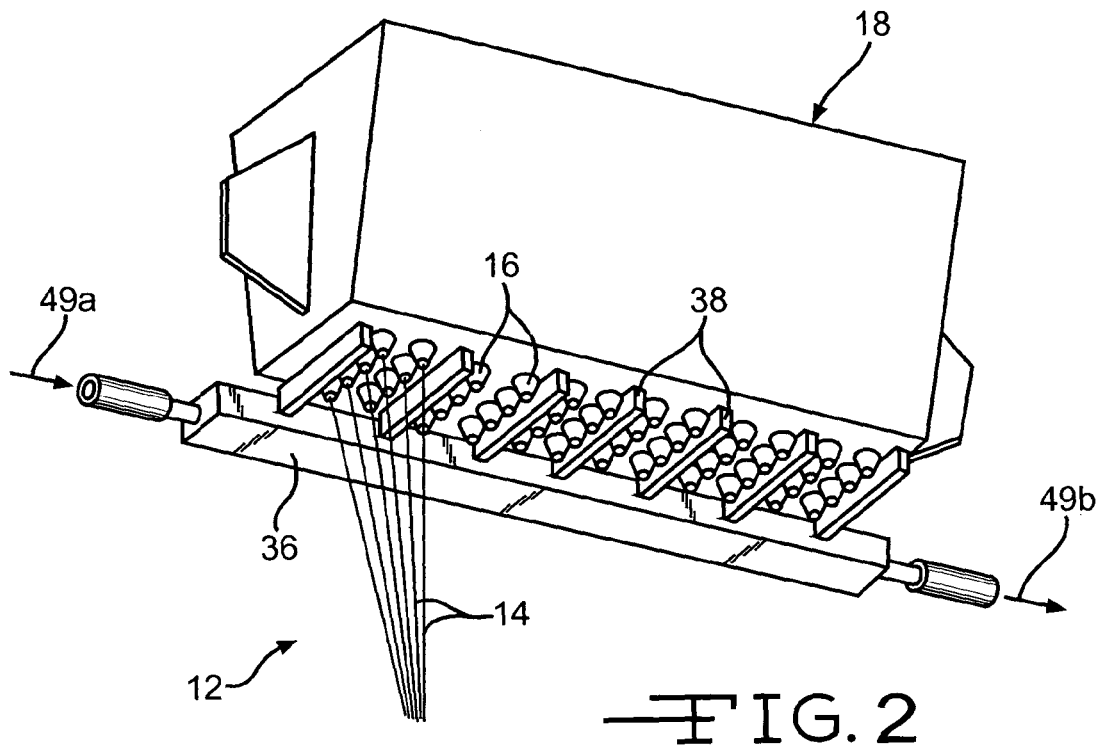
FIG. 2 is a bottom schematic perspective view of the forming and cooling apparatus illustrated in FIG. 1.

Referring now to the drawings, a glass filament forming apparatus is shown generally at 10 in FIGS. 1 and 2. The glass filament forming apparatus 10 includes a cooling apparatus 12 in accordance with the invention. As shown in FIG. 1, filaments 14 are drawn from a plurality of nozzles 16 of a bushing 18 and preferably gathered into a strand 20 by a gathering shoe 22. If desired, size can be applied to coat the filaments by a size applicator 24. A reciprocating device 26 guides the strand 20, which is wound around a rotating collet 28 in a winding apparatus 30 to build a cylindrical package 32.

Figure 3:
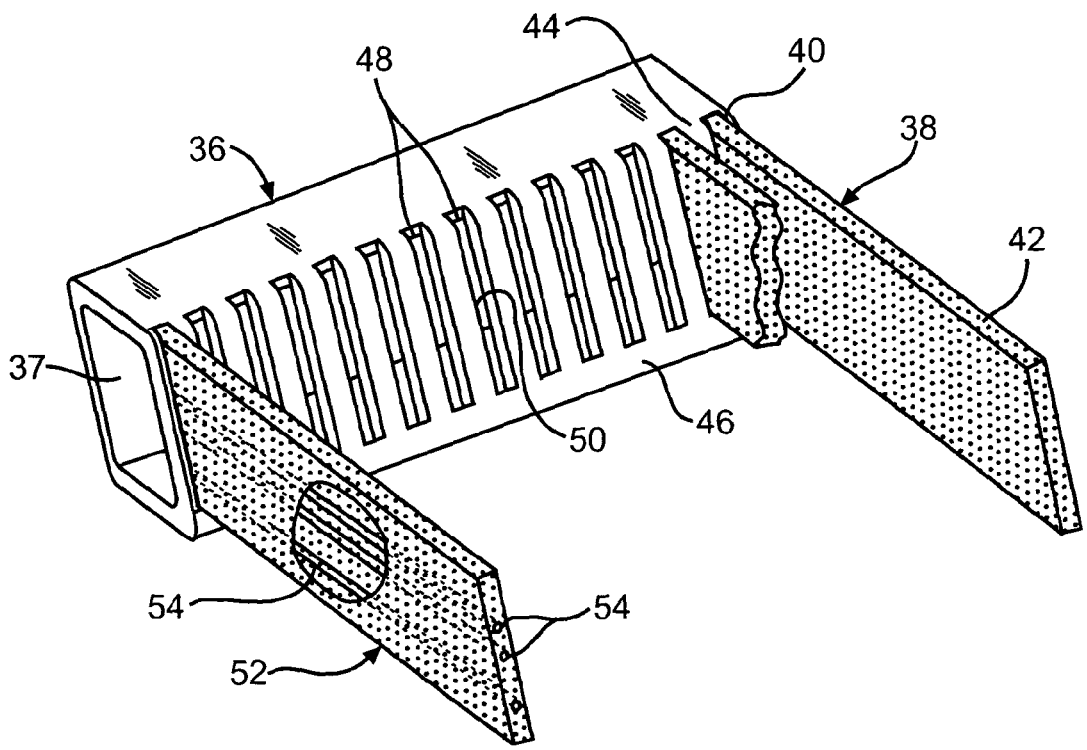
FIG. 3 is a perspective view of the cooling apparatus illustrated in FIGS. 1 and 2, showing two alternate embodiments of the fin.

The cooling apparatus 12 is located beneath the bushing 18 to cool or quench a filament forming area 34. As shown in FIGS. 2 and 3, the cooling apparatus 12 includes a manifold 36. The manifold 36 preferably includes one or more internal fluid channels 37 that extend along the longitudinal axis of the manifold 36, as best shown in FIG. 3.

The cooling apparatus 12 includes a plurality of cooling fins 38 coupled to the manifold 36. Preferably, the cooling fins 38 are approximately rectangular in shape and include a first end 40 adjacent the manifold 36 and a second, distal end 42. The fins 38 can also have any other desired shape appropriate to achieve the desired cooling of the filament forming area 34.

Each cooling fin 38 is spaced from an adjacent fin, such that adjacent fins 38 define a space 44 therebetween. Such spaces 44 allow the fins 38 to be mounted between individual rows, or groups of rows, of the nozzles 16 and permit the glass filaments 14 to pass on either side of the fins 38. The cooling fins 38 may be cantilevered from a single water-cooled manifold 36 or may be secured at each end to a pair (not shown) of water-cooled manifolds.

The cooling fins 38 are preferably coupled to a mounting surface 46 of the manifold 36. More preferably, the cooling fins 38 are coupled within slots 48 formed in the mounting surface 46 of the manifold 36. Fluid apertures 50 are formed in each slot 48 such that fluid can flow from the fluid channel 37 of the manifold 36 to the fins 38.

At least a portion of an outer surface of each cooling fin 38 includes porous material. Preferably the outer surface of each cooling fin 38 includes a porous material covering about 20 percent to about 90 percent of the outer surface. More preferably, the outer surface of each cooling fin 38 includes a porous material covering at least about 50 percent of the outer surface.

Preferably, the entire fin 38 is of porous material formed by any suitable process, such as sintering. As used herein, sintering is defined as a process whereby material in powder form is heated to a high temperature less than the melting point of the material. Such heating produces a porous material that is fused or bonded.

Preferably, each cooling fin 38 will have a substantially uniform porosity. More preferably, the cooling fins 38 have a porosity within the range of about 5 percent to about 20 percent. As used herein, porosity is defined as the ratio of the volume of pores to the total volume of the cooling fin 38.

The cooling fins 38 can be formed having pores of any desired size. Preferably, the cooling fins 38 are formed having pores within the range of from about 0.1 microns to about 100 microns.

The fins 38 can be formed of any desired high temperature, corrosion resistant material which can be compacted and sintered. Such materials include, for example, stainless steel, nickel, titanium, and alloys such as nickel-chromium-molybendium-tungsten alloy.

In operation, a cooling fluid supply conduit 49a for delivering a cooling fluid, such as water, delivers the cooling fluid to the manifold 36, as best shown in FIG. 2. An exit conduit 49b is also provided. The water travels through the channel 37, the aperture 50, and to the fins 38. The fluid then moves through the porous material of the fin 38 by capillary action. Although the cooling fluid in the exemplary embodiment illustrated in FIG. 1 has been described as water, it will be appreciated that any desired fluid can be used.

When the fins 38 are exposed to the relatively high temperature of the heated glass filaments 14, the fluid within the porous material of the fins 38 is caused to vaporize. As the fluid within the porous material vaporizes, the fluid absorbs heat from the filament forming area 34 and the filaments 14, and thereby cools the filaments 14 and the filament forming area 34. Such vaporization allows heat to be removed from the filaments 14 at a faster rate than would be possible with conventional fins or fin shields relying on radiant or convective heat transfer.

The vaporization of the cooling fluid from the fins causes replenishment of the cooling fluid from the manifold 36 by capillary action. If desired, the pressure of the cooling fluid can be increased such that pressurized vaporized fluid is discharged into the filament forming area 34 as a mist or spray. Such mist or spray enhances the cooling of the filaments 14 in the filament forming area 34. Even where there is no discharge of a mist or spray, pressurization of the cooling fluid will increase the flow of cooling fluid through the porous material of the fins 38.

One skilled in the art will appreciate that there are many possible variations on the particular embodiment described above that would be consistent with the principles of the invention. An alternate embodiment of the fin is shown at 52 in FIG. 3. Each fin 52 includes at least one bore 54 formed within the fin 52 wherein the bore 54 is in fluid communication with the fluid channel 37 and the porous material of the fin 52.

Figure 4:
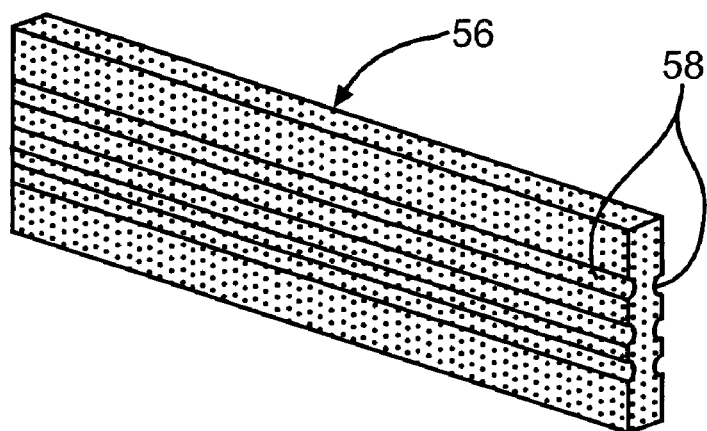
FIG. 4 is a perspective view of another alternate embodiment of the fin.

Another alternate embodiment of the fin is shown at 56 in FIG. 4. Each fin 56 includes at least one groove 58 formed in or on a surface of the fin 56 wherein the groove 58 is in fluid communication with the fluid channel 37 and the porous material of the fin 56. The bores 54 of the fins 52 and the grooves 58 of the fins 56 can provide improved fluid flow from the channel 37 to the porous material of the fins 52 and 56. The bores 54 and grooves 58 can be of any desired size so as to ensure that the fins 38 are always saturated with fluid.

Figure 5:
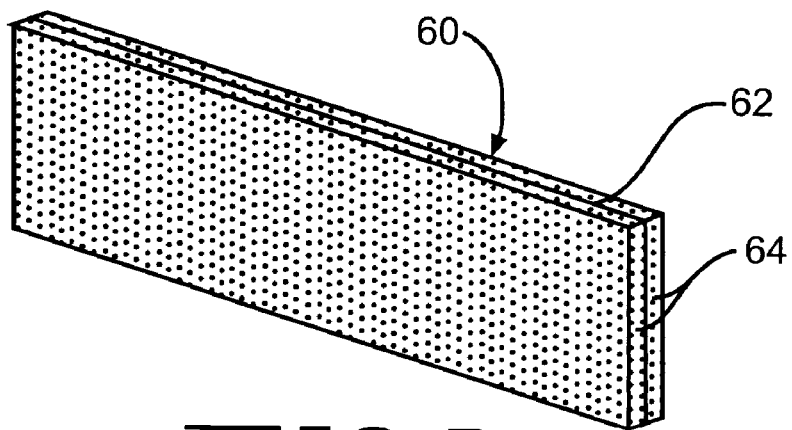
FIGS. 5 through 11 are perspective views of additional alternate embodiments of the fin.

Yet another alternate embodiment of the fin is shown at 60 in FIG. 5. Each fin 60 includes a substrate 62, which can be comprised of any desired metal, such as copper, or of ceramic material. The fins 60 also include an outer layer 64 of porous material, such as the material of the fin 38.

Figure 6:
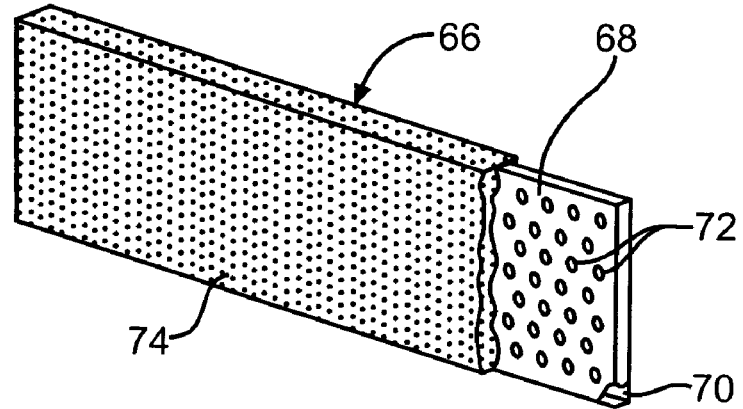
Figure 7:
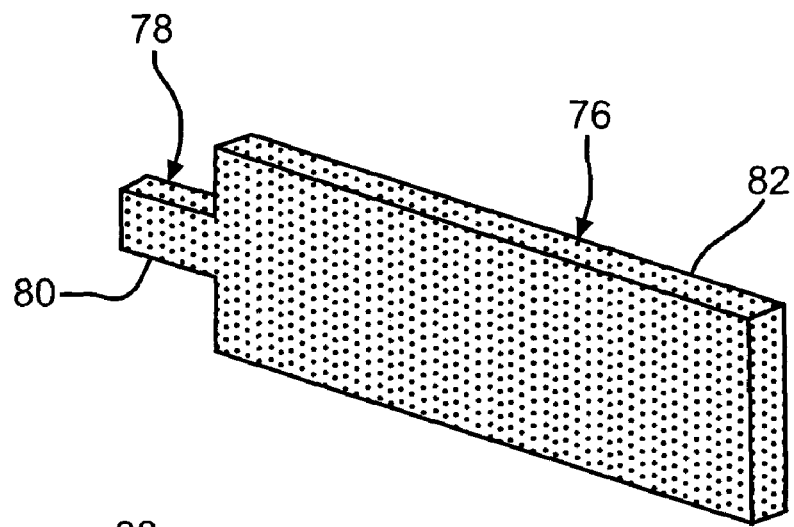

Another alternate embodiment of the fin is shown at 66 in FIG. 6. Each fin 66 is substantially identical to the fins 60, but includes a substrate 68 having at lease one internal channel 70 and a plurality of apertures 72 to provide fluid flow to the layer 74 of porous material. An additional alternate embodiment of the fin is shown at 76 in FIG. 7.

Each fin 76 is substantially identical to the fins 38, but includes a neck 78 at a first end 80 of the fin 76, and a fin body 82. In the exemplary embodiment illustrated, the neck 78 is shown at a first end 80 of the fin 76. However, it will be appreciated that such a neck 78 can be formed at any desired location on the fins 76. Additionally, each fin 76 can include more than one neck 78. The neck 78 is preferably substantially narrow relative to the fin body 82. Such a narrow neck limits evaporation, and therefore cooling, in the vicinity of the neck 78, where cooling is not needed. Such a neck 78 can be of any desired length and width so as to selectively control evaporation of fluid at the neck 78.

Figure 8:
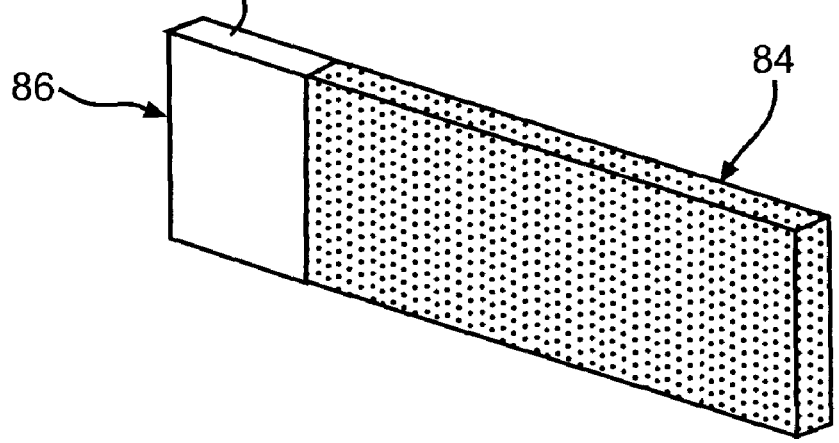

Another alternate embodiment of the fin is shown at 84 in FIG. 8. Each fin 84 is substantially identical to the fins 38, but includes a mask portion 86. In the exemplary embodiment illustrated, the mask portion 86 is shown at a first end 88 of the fin 84. However, it will be appreciated that such a mask portion 86 can be disposed at any desired location on the fins 84. Additionally, each fin 84 can include more than one mask portion 86. Such a mask portion 86 substantially covers the porous material, thereby limiting evaporation cooling at the mask portion 86. The mask portion 86 can be made of any desired porous material with a mechanically machined surface to close the pores on the desired portion of the surfaces. The mask portion 86 also can be manufactured of any desired substantially non-porous material, and can be applied to the fin 84 by any desired method, including spraying or with an adhesive. The mask portion 86 can be of any desired length and width so as to selectively control evaporation of fluid throughout the fin 84. Further, the porosity of the porous material can be varied according to any desired pattern. For example, the fins can be configured so that the porosity of the porous material increases from bottom to top of the fins.

Figure 9:
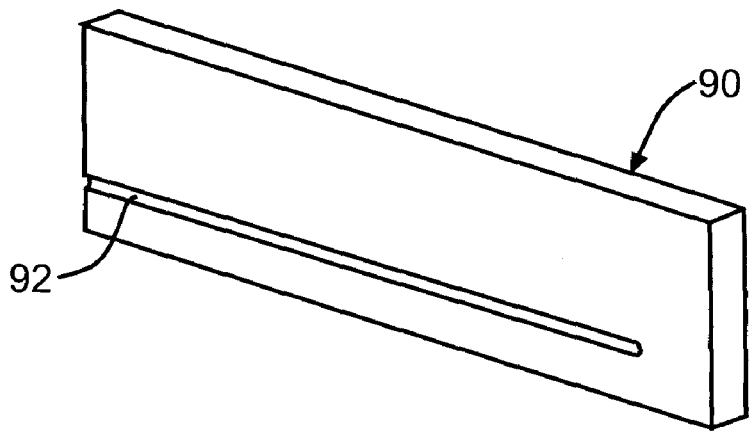

Another alternate embodiment of the fin is shown at 90 in FIG. 9. Each fin 90 preferably substantially solid and formed of any desired material. Each fin 90 can include at least one groove 92 formed in a surface of the fin 90 wherein the groove 92 is in fluid communication with the fluid channel 37 of the manifold 36. The grooves 92 of the fins 90 can provide a fluid flow path from the channel 37 to any desired location of the fins 90. The grooves 92 can be of any desired size and length so as to ensure that a desired amount of fluid is available for evaporation along the length of the fins 90.

Figure 10:
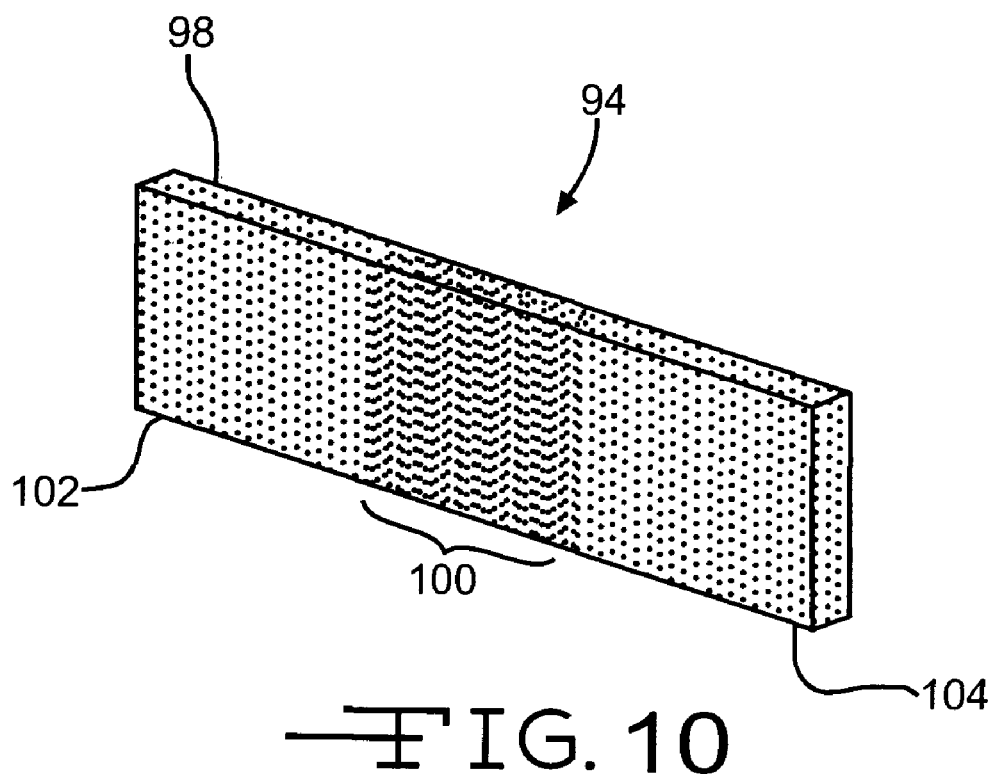
Figure 11:
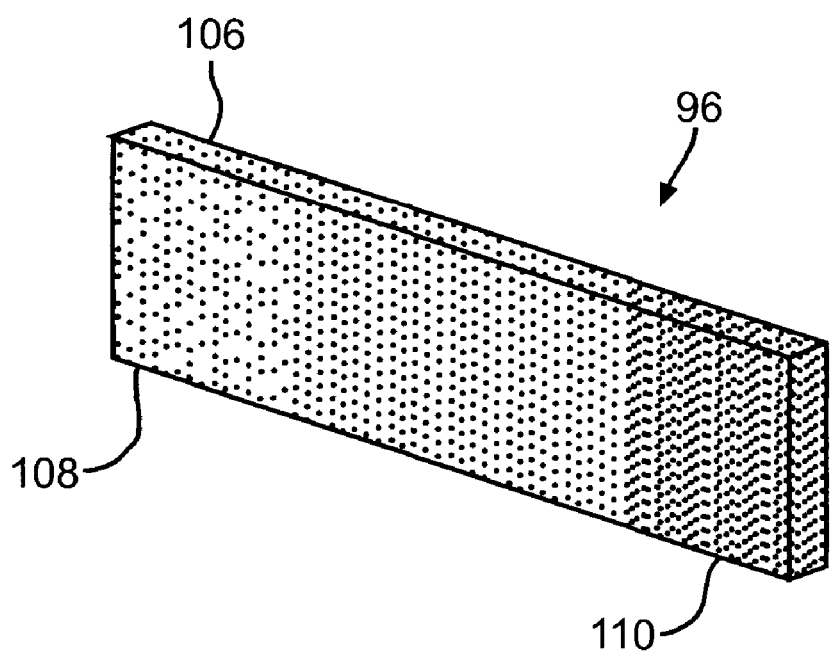

Additional alternate embodiments of the fin are shown at 94 and 96 in FIGS. 10 and 11, respectively. Each fin 94 and 96 is substantially identical to the fins 38, however the porosity of each fin varies throughout a length of each fin 94 and 96. For example, as shown in FIG. 10, the porosity of the porous material 98 is greater at a central region 100 intermediate a first end 102 and a second end 104 of each fin 94 relative to the porosity at the first end 102 and the second end 104. As shown in FIG. 11, the porosity of the porous material 106 increases from a first end 108 to a second end 110 of each fin 96. By increasing or decreasing the relative porosity of the fins 94 and 96, fluid evaporation can be controlled at any position along the length of the fins 94 and 96.

The principle and mode of operation of this invention have been described in its preferred embodiments. However, it should be noted that this invention can be practiced otherwise than as specifically illustrated and described without departing from its scope.

What is claimed is:

1. A cooling apparatus for cooling a glass filament forming area beneath a bushing of a filament forming apparatus, the cooling apparatus comprising:
   a manifold defining a fluid channel; and
   a plurality of cooling fins connected to the manifold, wherein at least a portion of a surface of the fins includes porous material, and wherein the porosity of the porous material varies throughout at least one: i) of a length of the fins, or ii) from atop to a bottom of the fins.

2. The cooling apparatus according to claim I, wherein the fluid channel is connected to porous material so that cooling fluid can be infroduced from the fluid channel to the porous material.

3. The cooling apparatus according to claim 1, wherein the porous material is configured to enable the cooling fluid to move through the porous material by capillary action.

4. The cooling apparatus according to claim 1, wherein the fins include a bore formed within the fin, and wherein the bore is in fluid communication with the porous material.

5. The cooling apparatus according to claim 1, wherein the porosity of the porous material increases from a first end to a second end of the fins.

6. The cooling apparatus according to claim 1, wherein the porosity of the porous material is greater intemiediate a first end and a second end of the fins relative to the porosity at the first end and the second end of the fins.

7. The cooling apparatus according to claim 1, wherein the portion of the outer surface comprised of the porous material is within the range of from about 20 percent to about90percent of the total outer surface.

8. The cooling apparatus according to claim 1, wherein the cooling fin includes a substrate and an outer layer of porous material.

9. The cooling apparatus according to claim 8, wherein the substrate has at least one internal channel and a plurality of apertures configured to provide fluid flow to the outer layer of porous material.

10. The cooling apparatus according to claim 1, wherein the cooling tin includes at least one neck at a first end of the fin, and a fin body, wherein the neck is narrow relative to the fin body.

11. The cooling apparatus according to claim 1, wherein the cooling fin includes at least one mask portion, wherein the mask portion is at a first end of the cooling fin.

12. A cooling apparatus for cooling a glass filament forming area beneath a bushing of a filament forming apparatus, the cooling apparatus comprising:
   a manifold defining a fluid channel; and
   a plurality of cooling fins connected to the manifold, wherein at least a portion of a surface of the fins includes porous material,
   wherein the fins include a groove formed on a fin surface, and wherein the groove is in fluid communication with the porous material.

13. An apparatus for producing continuous glass filaments comprising:
   a bushing for supplying skeams of molten glass to be drawn into continuous glass filaments; and
   a cooling apparatus for cooling a glass filament forming area beneath the bushing, the cooling apparatus including:
   a manifold defining a fluid channel; and
   a plurality of cooling fins connected to the manifold, wherein at least a portion of a surface of each fin includes porous material, and wherein the porosity of the porous material varies throughout at least one: i) of a length of the fins, or ii) from a top to a bottom of the fins.

14. The cooling apparatus according to claim 13, wherein the fluid channel is connected to porous material so tat cooling fluid can be introduced from the fluid channel to the porous material.

15. The cooling apparatus according to claim 13, wherein the porous material is configured to enable the cooling fluid to move through the porous material by capillary action.

16. The cooling apparatus according to claim 13, wherein the fins include a bore formed within the fin, and wherein the bore is in fluid communication with the porous material.

17. The cooling apparatus according to claim 13, wherein the porosity of the porous material increases from a first end to a second end of the fins.

18. The cooling apparatus according to claim 13, wherein the porosity of the porous material is greater intermediate a first end and a second end of the fins relative to the porosity of the first end and the second end of the fins.

19. The cooling apparatus according to claim 13, wherein the porosity of the porous material increases from bottom to top df the fins.

20. An apparatus for producing continuous glass filaments comprising:
- a bushing for supplying streams of molten glass to be drawn into continuous glass filaments; and
- a cooling apparatus for cooling a glass filament forming area beneath the bushing, the cooling apparatus including:
  - a manifold defining a fluid channel; and
  - a plurality of cooling fins connected to the manifold, wherein at least a portion of a surface of each fin includes porous material, wherein the fins include a groove formed on a fin surface, and wherein the groove is in fluid communication with the porous material.

* * * * *